United States Patent
Mao et al.

(10) Patent No.: US 8,259,679 B2
(45) Date of Patent: Sep. 4, 2012

(54) SIGNAL QUALITY MEASUREMENT IN A TIME DIVISION DUPLEX SYSTEM

(75) Inventors: Jie Mao, Beijing (CN); Bin Xu, Beijing (CN); Huaisong Zhu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 240 days.

(21) Appl. No.: 12/676,057

(22) PCT Filed: Sep. 4, 2007

(86) PCT No.: PCT/SE2007/050614
§ 371 (c)(1),
(2), (4) Date: Mar. 2, 2010

(87) PCT Pub. No.: WO2009/031953
PCT Pub. Date: Mar. 12, 2009

(65) Prior Publication Data
US 2010/0202304 A1    Aug. 12, 2010

(51) Int. Cl.
*H04W 4/00* (2009.01)
*H04B 7/212* (2006.01)
(52) U.S. Cl. .................... 370/331; 370/337
(58) Field of Classification Search .............. None
See application file for complete search history.

(56) References Cited

U.S. PATENT DOCUMENTS

| 7,529,525 | B1* | 5/2009 | Hovers et al. ............ 370/339 |
| 2004/0170132 | A1* | 9/2004 | Shin et al. ............... 370/294 |
| 2006/0007896 | A1* | 1/2006 | Grieco ................... 370/335 |
| 2007/0087742 | A1 | 4/2007 | Austin et al. |

FOREIGN PATENT DOCUMENTS

| EP | 1 071 305 A2 | 1/2001 |
| WO | WO 98/25362 A1 | 6/1998 |
| WO | WO 2006/084907 A1 | 8/2006 |

OTHER PUBLICATIONS

Written Opinion dated Jul. 16, 2008 (6 pages).

* cited by examiner

*Primary Examiner* — Xavier S. Wong
(74) *Attorney, Agent, or Firm* — Myers Bigel Sibley & Sajovec, P.A.

(57) ABSTRACT

The invention discloses a method (600) for use in a wireless communications system (100) in which there is at least one node (110-115) which controls the traffic to and from all user terminals (130) in a cell (120) within the system. In the system (100), use is made of the TDD principle for communication between said controlling node (110-115) and its user terminals (130), and according to the method (600), the controlling node transmits (610) a beacon signal for use as a signal quality indicator by the user terminals, said beacon signal being transmitted in a first TDD time slot (232). The user terminals (130) measure (620) the signal quality of the beacon signal and the signal quality in at least a second TDD time slot (234), and report (630) measurements of the signal qualities in both said first and second time slots to the controlling node.

18 Claims, 7 Drawing Sheets

SIGNAL QUALITY MEASUREMENT IN A TIME DIVISION DUPLEX SYSTEM

TECHNICAL FIELD

The present invention discloses a signal quality measurement method for use in a Time Division Duplex system, a TDD system.

BACKGROUND

In present time division duplex (TDD) systems, such as for example, the TD-SCDMA (Synchronous Code Multiple Access) systems, a user terminal, a UE, can be handed over between different base stations depending on the received signal strength at the UE. The base stations in such systems are usually referred to as NodeB. One function of the NodeB is to route all traffic to and from UEs within a certain area in the system, a so called "cell".

Thus, if the signal strength from the NodeB to which the UE is at present "attached" falls below a certain level, and there is another NodeB whose signal the UE receives stronger, the UE can be handed over from the present NodeB to the new Node B. i.e. the NodeB with the higher signal strength.

In some systems, the strength of the signal which the UE receives from its NodeB is reported by the UE to the NodeB. In the TD-SCDMA system, this is done by means of a parameter known as P-CCPCH RSCP, Primary Common Control Physical Channel Received Signal Code Power. Thus, the NodeB transmits a "beacon" signal on the channel known as P-CCPCH, and the UE reports the P-CCPCH RSCP to the NodeB. Based on these reports, decisions are made regarding handover of the UE between different NodeBs. A special time slot in the system is usually dedicated to the transmission of the P-CCPCH.

A problem in this context is that the P-CCPCH RSCP only reflects the received signal strength from the NodeB in the P-CCPCH down link channel, which is transmitted in a certain time slot. Thus, for example, signal deficiencies in other channels/time slots than the one used by the NodeB for the P-CCPCH channel will not lead to a handover of the UE to another NodeB, although such deficiencies may seriously degrade the performance of the UE.

SUMMARY

Thus, as explained above, there is, in a time division duplex system such as TD-SCDMA, a need for a solution by means of which deficiencies in the signal received by UEs other than a weak RSCP in a dedicated channel may be detected and used for handover purposes.

Such a solution is offered by the present invention in that it discloses a method for use in a wireless communications system in which there is at least one node, e.g. a NodeB, which controls the traffic to and from all user terminals in a certain area or cell within the system, and in which system use is made of the TDD (Time Division Duplex) principle for communication between said controlling node and its user terminals.

According to the method of the invention, the controlling node transmits a beacon signal for use as a signal quality indicator by the user terminals. The beacon signal is transmitted in a first TDD time slot, and according to the method of the invention, user terminals measure the signal quality of the beacon signal and the signal quality in at least a second TDD time slot, and the user terminals report measurements of the signal qualities in both the first and second time slots to the controlling node.

In a certain embodiment of the invention, the signal quality measurement which is measured in the second time slot is the interference level in the second time slot. In another embodiment, the user terminals report a ratio between the interference level in the second time slot and the strength of the beacon signal in the first time slot to the controlling node.

Thus, by means of the invention, it will be possible to achieve better measuring of signals from a NodeB to UEs ("downlink signalling") in a TDD system which uses a beacon signal in a dedicated time slot and downlink signalling in other dedicated time slots. The improved measuring of signals can in turn be use as an improved basis on which to take decisions regarding handovers of UEs between NodeBs.

BRIEF DESCRIPTION OF THE DRAWINGS

The invention will be described in more detail in the following, with reference to the appended drawings, in which.

DETAILED DESCRIPTION

Figure 1:
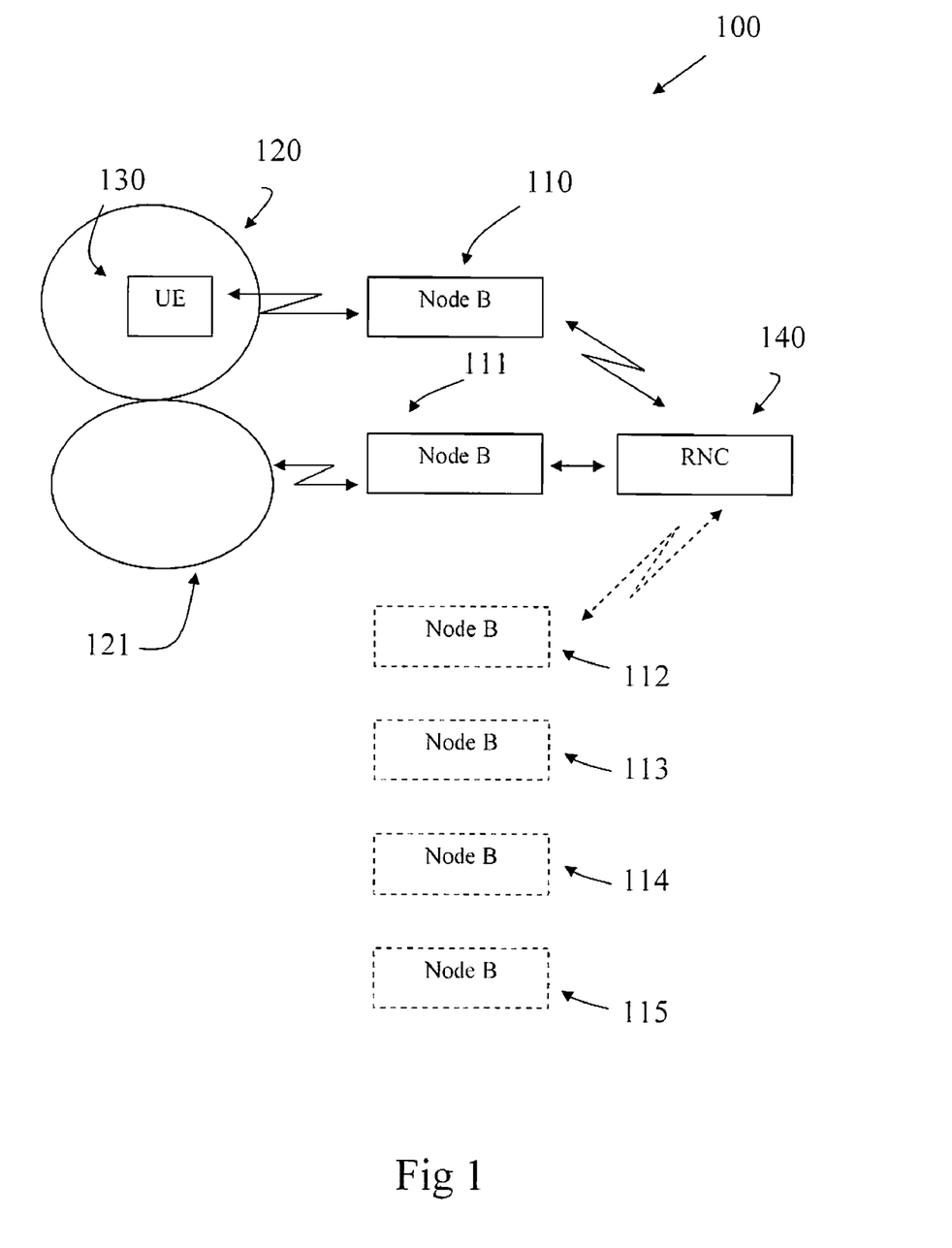
FIG. 1 shows a schematic overview of a system in which the present invention may be applied.

FIG. 1 shows a schematic view of a system 100 in which the present invention may be applied. Thus, the system in FIG. 1 is a TDD system, and in this example it will be described as a TD-SCDMA system (Time Division Synchronous Code Multiple Access), although it should be realized that the invention may be used in a variety of TDD systems in which As shown in FIG. 1, the system 100 comprises a number of base stations 110, referred to as "NodeB". One purpose of a NodeB is to control the traffic to and from user terminals, UEs, in a certain area, a so called cell, in the system.

FIG. 1 shows a number of NodeBs 110-115, two of which, 110, 111, are shown with their respective cells, 120 and 121. The possible presence of a number of UEs in each cell is symbolically indicated by means of one UE 130 in cell 120.

Also shown in FIG. 1 is the "next level" in the system as seen from the NodeBs, i.e. a so called Radio Network Controller, an RNC 140. One function of the RNC 140 is to order hand over of a UE from one NodeB to another NodeB.

The decisions regarding handover of UEs between NodeBs is, in the system shown in FIG. 1, based on signal strength measurements form the UEs to their respective NodeB, measurements which are forwarded to the RNC so that it may take decisions on handover based on those measurements.

Figure 2:
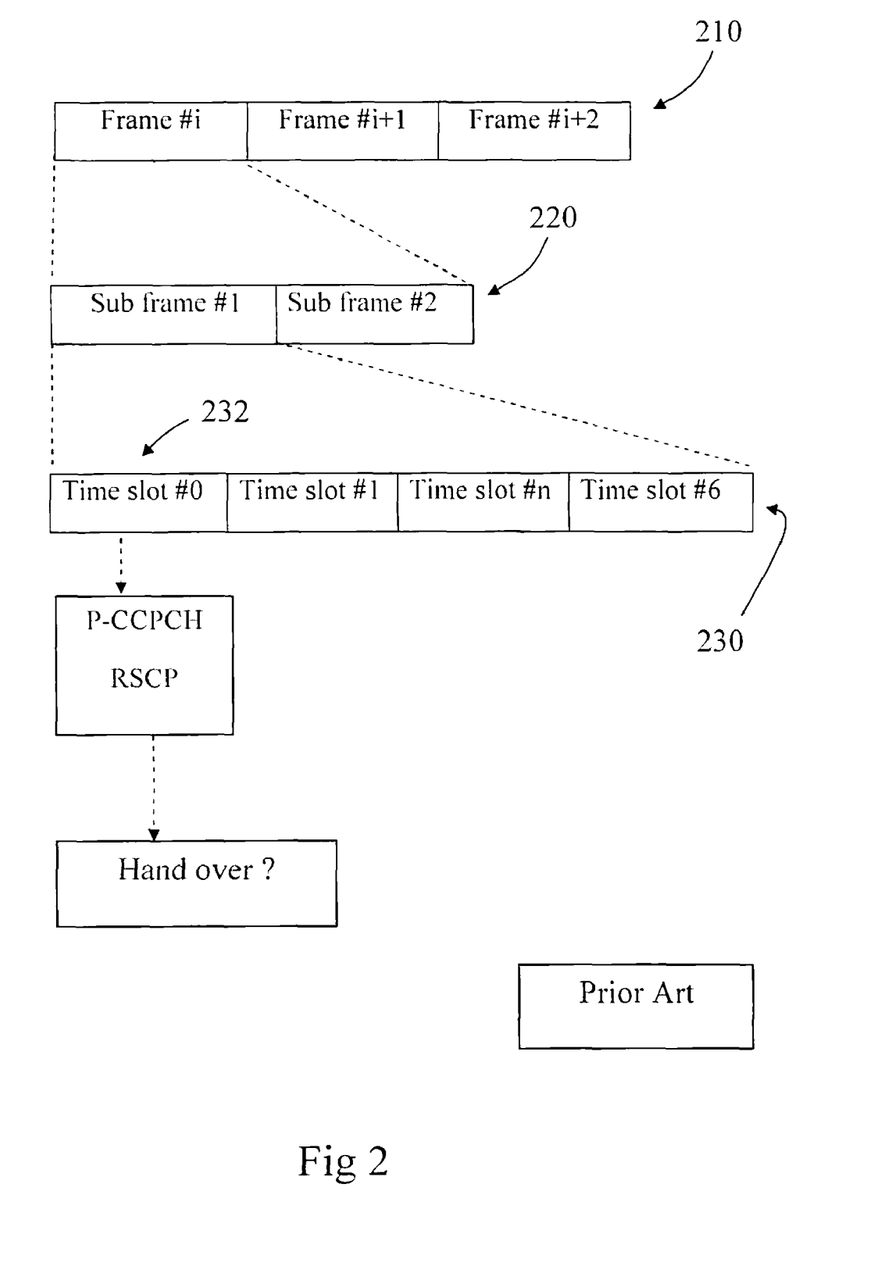
FIGS. 2 and 3 show prior art.

FIG. 2 shows a principle employed in the present TD SCDMA system: the system utilizes time frames 210, shown as time frame number #i, i+1 and i+2. Each time frame is divided into sub frames 220, sub frames 1 and 2 of time slot number i being shown in FIG. 2 as examples. Also, each sub frame is divided into a number of time slots 230, with time slots number 0-6 of sub frame number 1 being shown as examples in FIG. 2.

In a TD-SCDMA system, the NodeB transmits a signal on a dedicated channel, the so called P-CCPCH channel, Primary Common Control Physical Channel. As indicated in FIG. 2, a special time slot 232, in this case time slot number 0 is used for the transmission of the P-CCPCH channel. The UEs in the cell of the transmitting NodeB measure the signal strength of the P-CCPCH, and report the received signal strength to the NodeB, which may forward the measurements to the RNC (shown in FIG. 1), where the measurements are used as the basis for decisions regarding handover of UEs between NodeBs.

The signal strength measurements of the P-CCPCH channel are so called RSCP measurements, Received Signal Code Power.

Figure 3:
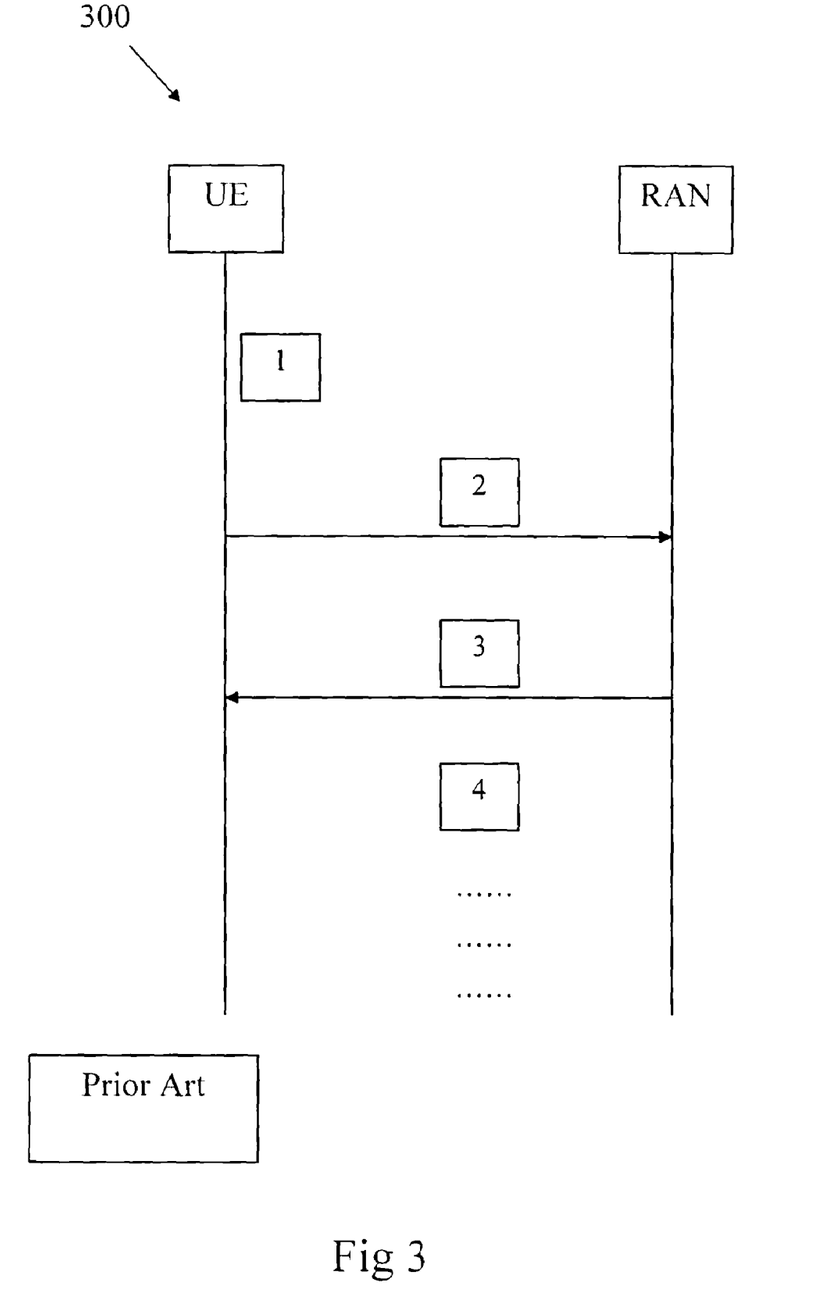

FIG. 3 is an event diagram 300 of a sequence in a prior art TD-SCDMA system. The nodes involved are shown as UE and RAN, Radio Access Network, which may be seen as the combination of the NodeB and the RNC. It should be pointed out that signalling between an UE and an RNC will go via a "base station", a NodeB.

The numerals in boxes in FIG. 3 should be interpreted as follows:

1: The UE measures the P-CCPCH RSCP from its NodeB as being lower than a certain predetermined threshold. The UE can measure the P-CCPCH RSCP according to a number of principles, but in a preferred embodiment, when the UE sets up a call or a dedicated channel to the NodeB, the measurements of P-CCPCH RSCP are initiated, and the UE measures the P-CCPCH RSCP continuously, sub frame by sub frame, and the UE sends measurement reports to the RAN if the P-CCPCH RSCP is lower than a certain threshold. Naturally, as alternatives, the P-CCPCH RSCP can be measured at intervals instead, regular or otherwise, and the reports can be sent by the UE regardless of the level of the P-CCPCH RSCP.

2: The UE sends its measurement report of the P-CCPCH RSCP to the RAN, the Radio Access Network, in this case the NodeB, which may forward the measurement to the RNC.

3: The RAN, i.e. the NodeB, sends a Measurement Control command to the UE, i.e. a command which prompts the UE to measure the P-CCPCH RSCP of neighbouring NodeBs.

4: The handover procedure of the system is triggered. This procedure is not shown in detail here, since it is not an intrinsic part of the invention, and since it is also well known to those skilled in the art.

Figure 4:
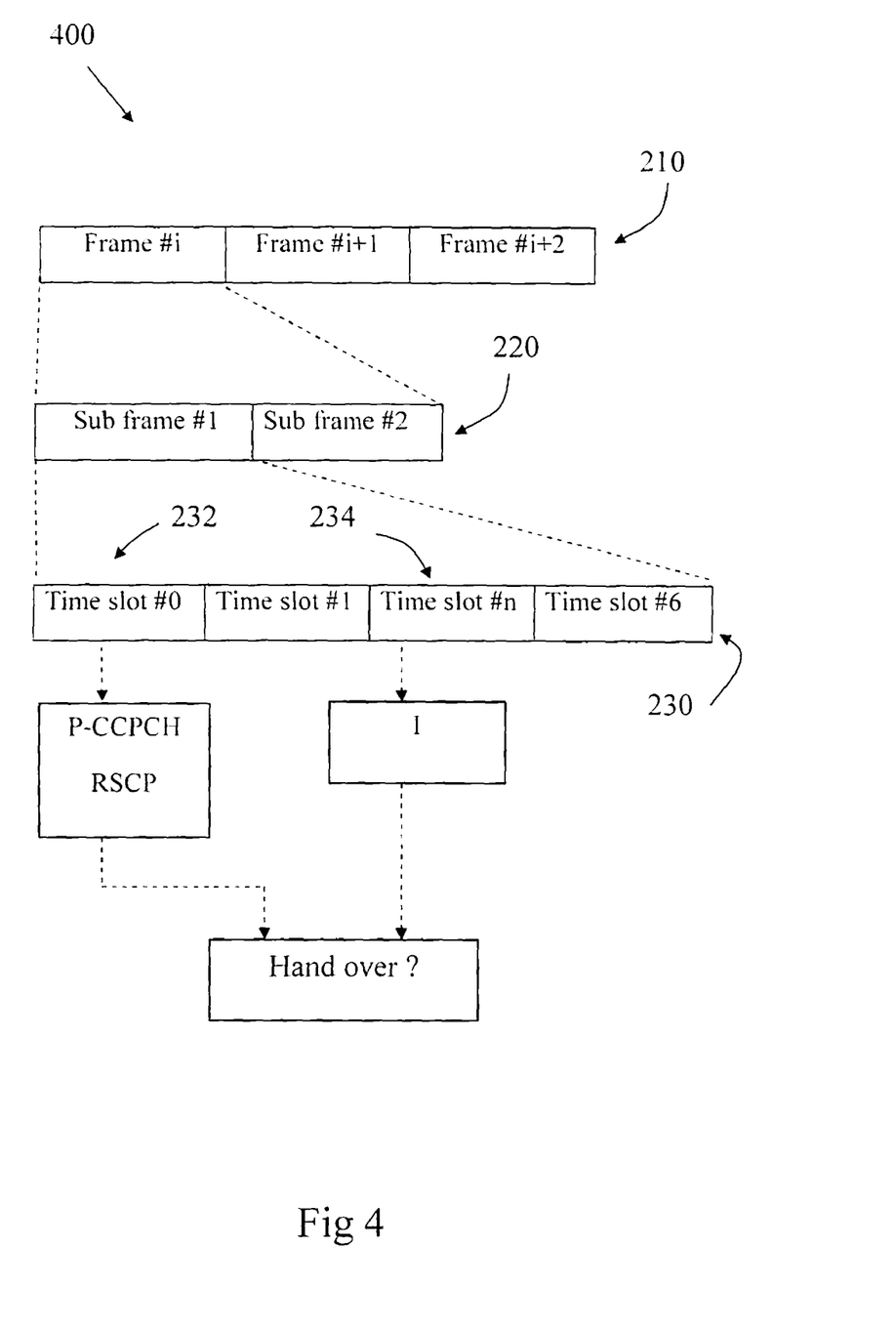
FIG. 4 shows an embodiment of the present invention.

FIG. 4 is a diagram 400 which shows a principle of the present invention: As can be seen in FIG. 4, the time division principle shown in FIG. 2 is the one for which the invention is intended, although the invention may in principle also be employed in other time division systems in which there is a "beacon" signal or channel in one time subdivision such as a time slot, and "payload" traffic in other time subdivisions such as time slots.

As has been indicated above, the RSCP measurements employed by the present TD-SCDMA system has a number of drawbacks, mainly caused by the fact that signal performance in the time slot 232 allocated to the "beacon channel", in this case time slot number 0 can differ dramatically from the signal performance in the time slots used by the "payload" traffic such as the dedicated down link traffic channels. Thus, the P-CCPCH RSCP measurements in time slot 0 may not properly reflect the down link signal quality of the dedicated channels in the other time slots.

In order to improve the down link channel quality reports from the UE to the RAN, the present invention introduces the use of a new quality measurement indicator which will better reflect the signal quality in the dedicated down link channels. In order to also preserve the P-CCPCH RSCP measurements, the invention proposes to combine those measurements with the new quality measurement indicator.

Thus, according to the invention, the UE will measure the down link signal quality in at least a second time slot 234 apart from the one used for the P-CCPCH channel. This second time slot 234 is indicated as time slot number n in FIG. 4, which is naturally only to be seen as an example, the time slot 234 chosen for the down link signal measurement according to the invention can be more or less any of the down link channel time slots.

In addition, if more than one time slot in one and the same frame is used by the UE for down link traffic, several options are available when it comes to measuring the quality of those time slots. Examples of such options are:

1. The UE can measure the RSCP in all of the time slots that the UE uses in one and the same time frame and send the measurement reports for all of those time slots to the RNC, and the RNC can compare the average of the all reports, maximum value or minimum value with the RNC internal threshold to decide if the next step in the hand over procedure should be triggered.

2. The UE can measure only one time slot or part of one or more of the time slots used.

In order to retain the information from the P-CCPCH RSCP measurements of the prior art, the invention proposes to retain those measurements, and the UE will, according to the invention, measure the signal quality of the beacon signal as well as the signal quality in said second time slot, and will report measurements of the signal qualities in both the P-CCPCH time slot and said second time slots to the UE's controlling node in the RAN, i.e. in this case the NodeB, which may report those measurements to the RNC where the measurements may be used as the basis for hand over decisions.

Suitably but not necessarily, the signal quality measurement which, according to the invention, is measured in the second time slot is the interference level in the second time slot. Other quality indicators may also be used, such as, for example, signal strength, or the UE uplink transmit power.

In one embodiment of the invention, the UE reports a ratio between the interference level in the second time slot and the strength of the beacon signal in the first time slot to the Node B, the controlling node. If the interference level in the second time slot is referred to as I, and the RSCP measurement is referred to as P, the ratio reported may thus be P/I, or alternatively, I/P.

In another embodiment of the invention, the user terminals can also report measurements of the signal quality in at least one additional time slot, i.e. a third time slot. As mentioned previously in this text, if the user terminal carries out measurements in more than one time slot per frame, a number of options are open. Also, the measurements can be reported regardless of the level of the ratio between the RSCP and the interference, but in a preferred embodiment, the reports are only transmitted by the UE when the ratio falls below a certain threshold.

Figure 5:
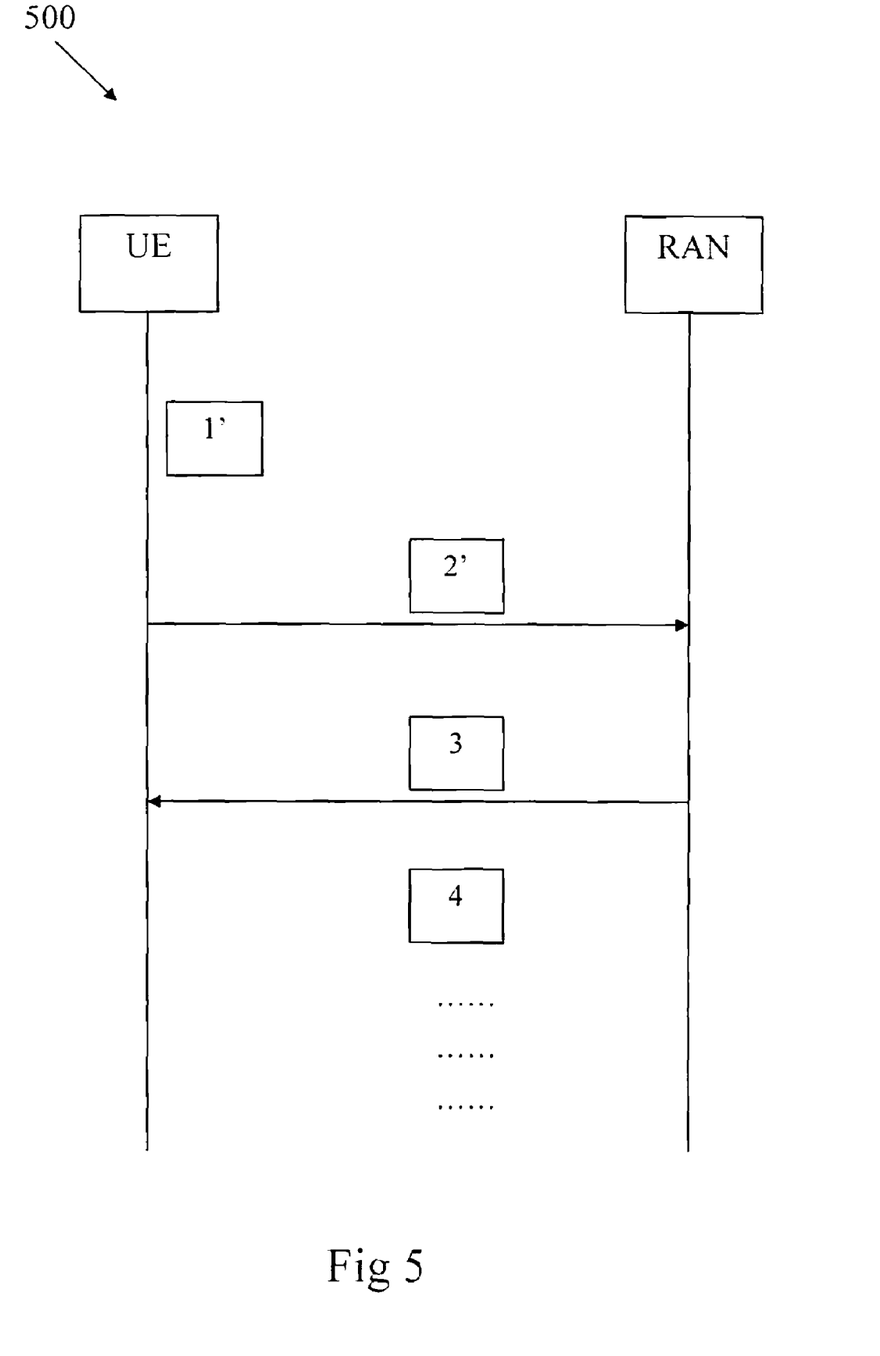
FIG. 5 shows an event diagram of an embodiment of the present solution.

FIG. 5 is an event diagram 500 of a sequence in a TD-SCDMA system in which the present invention is applied. In similarity to FIG. 3, the nodes involved are shown as UE and RAN, although it should be pointed out that signalling between an UE and an RNC will go via a "base station", a NodeB.

The numerals 1'-4' in the boxes in FIG. 5 which together with arrows illustrate the events in the diagram should be interpreted as follows:

1': The UE measures the P-CCPCH RSCP ("P") from its NodeB and the signal quality level ("I") in the second time slot, and notes that one or both is unsatisfactory, for example by means of determining the ratio between them, P/I, and seeing that the ratio is lower than a certain predetermined threshold. Also, it is possible to measure and report the P-CCPCH as well, and let the handover be triggered by the level of either of the parameters P-CCPCH or the ratio between the RSCP and the interference level.

2': The UE sends its measurement report of, for example, the ratio between P and I to the RAN, the Radio Access Network, in this case the NodeB, which may forward the measurement to the RNC for use in hand over decisions.

3': The RAN, i.e. the NodeB, sends a Measurement Control command to the UE, i.e. a command which prompts the UE to measure the P-CCPCH RSCP of neighbouring NodeBs.

4': The handover procedure of the system is triggered. This procedure is not shown in detail here, since it is not an intrinsic part of the invention, and since it is also well known to those skilled in the art. However, the hand over will involve handing over the control of the traffic to and from that UE to another NodeB which has a better signal strength at the UE.

Figure 6:
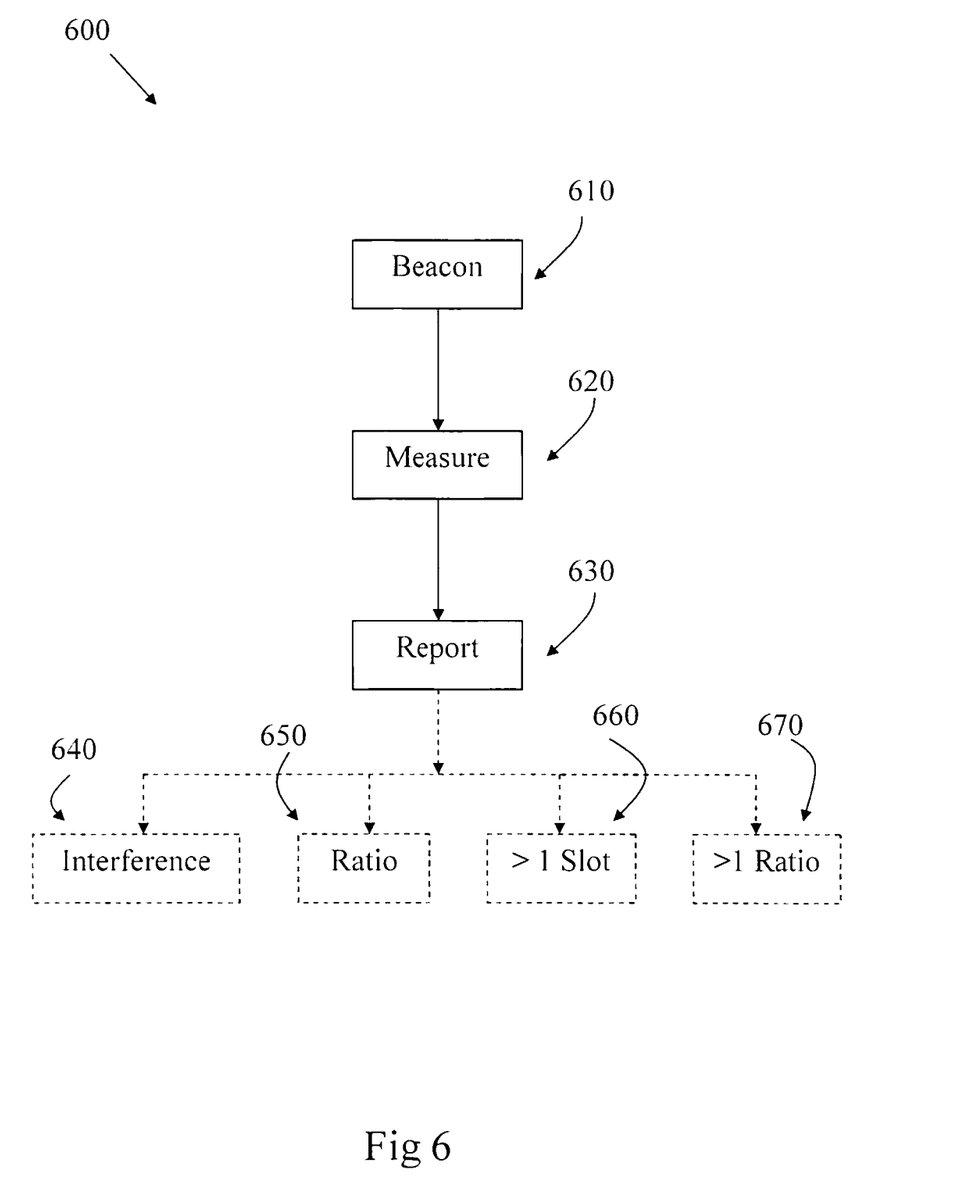
FIG. 6 shows a flow chart of a method of the present invention.

FIG. 6 shows a schematic flow chart 600 of some of the major steps of a method according to the invention. Steps which are options or alternatives are shown with dashed lines in FIG. 6.

Thus, the invention discloses a method 600 for use in a wireless communications system in which there is at least one node such as a NodeB which controls the traffic to and from all user terminals in a certain area or cell within the system. In the system in question, use is made of the TDD, Time Division Duplex, principle for communication between the controlling node and its user terminals.

According to the method of the invention, as shown in step 610, the controlling node transmits in a first TDD time slot a beacon signal for use as a signal quality indicator by the user terminals. As shown in step 620, the user terminals measure the signal quality of the beacon signal and the signal quality in at least a second TDD time slot, and as shown in step 630, the user terminals report measurements of the signal qualities in both the first and the second time slots to the controlling node.

As shown in step 640, according to the method of the invention, the signal quality measurement which is measured in the second time slot may be the interference level in the second time slot. As indicated in step 650, the user terminals nay report a ratio between the interference level in the second time slot and the strength of the beacon signal in the first time slot to the controlling node.

Step 660 shows that in one embodiment of the invention, the user terminals may also report measurements of the signal quality in at least one additional time slot, i.e. a third time slot, and as shown in step 670, the user terminals may report the ratio between the interference level in each of the second and third time slots and the strength of the beacon signal in the first time slot.

Figure 7:
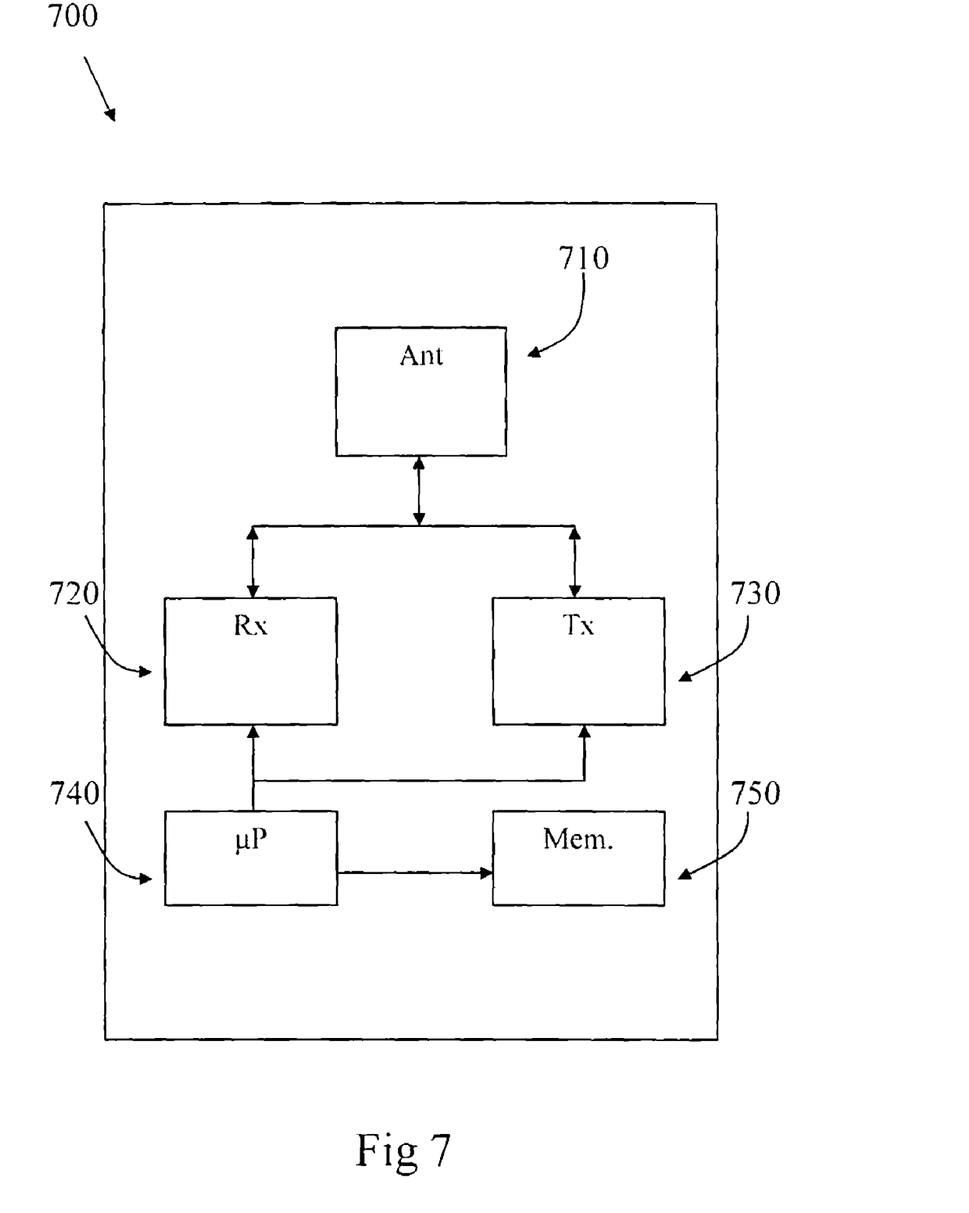
FIG. 7 shows a schematic block diagram of a user terminal of the invention.

FIG. 7 shows a rough block diagram of a user terminal 700 of the invention. As can be seen in FIG. 7, the user terminal 700 comprises an antenna 710 for communicating with the controlling node, the NodeB, and also comprises a transmitter 730 and a receiver 720. In addition, the user terminal 700 also comprises a control means such as for example a microprocessor 740, as well as comprising a memory 750.

Thus, the user terminal 700 is intended for use in a wireless communications system in which there is at least one node such as a base station, a "NodeB", which controls the traffic to and from the user terminal 700, and in which system use is made of the TDD principle for communication between the controlling node and the user terminal 700.

The user terminal is equipped with means for measuring the signal strength of a beacon signal transmitted by said controlling node in a first TDD time slot, said means suitably being the control means 740, and possibly also the memory 750. The beacon signal is received via the antenna 710 and the receiver 720.

The user terminal comprises means suitably the controlling means 740, for measuring the signal quality from the controlling node in at least a second TDD time slot, and the user terminal is further equipped with means such as the antenna 710 and the transmitter 730 for reporting the measurements of the signal qualities in both said first and second time slots to the controlling node.

The user terminal 700 may also comprise means for carrying out the signal quality measurement in said second time slot as the interference level in said second time slot. These means may be the controller 740, possibly with the aid of the memory 750. The user terminal 700 may also report a ratio between the interference level in the second time slot and the strength of the beacon signal in the first time slot to the controlling node, said ratio being calculated by the controller 740, and transmitted by means of the antenna 710 and the transmitter 730.

In addition, the user terminal 700 may also be equipped with means for reporting measurements of the signal quality in at least one additional time slot, i.e. a third time slot, to the controlling node, and for reporting said measurements as the ratio between the interference level in each of the second and third time slots and the strength of the beacon signal in the first time slot.

The invention is not limited to the examples of embodiments described above and shown in the drawings, but may be freely varied within the scope of the appended claims.

The invention claimed is:

1. A method for use in a wireless communications system in which there is at least one controlling node which controls traffic to and from all user terminals in a certain area or cell within the wireless communications system, and in which wireless communications system use is made of a Time Division Duplex (TDD) principle for communication between said controlling node and the user terminals, where the controlling node transmits a beacon signal for use as a signal quality indicator by the user terminals, said beacon signal being transmitted in a first TDD time slot, the method comprising:

receiving, by the user terminals, the beacon signal in the first TDD time slot;

measuring, by the user terminals, a signal quality of the beacon signal in the first TDD time slot and a signal quality in at least a second TDD time slot; and reporting, by the user terminals, to the controlling node, the signal quality of the beacon signal in the first TDD time slot and the signal quality in at least a second TDD time slot; and receiving a handover command from the controlling node responsive to the measurements of the signal quality of the beacon signal in the first TDD time slot and the signal quality in the at least second TDD time slot.

2. The method of claim 1, according to which the signal quality measurement which is measured in said second TDD time slot is an interference level in said second TDD time slot.

3. The method of claim 2, where the reporting includes:
reporting a ratio between the interference level in the second TDD time slot and a strength of the beacon signal in the first TDD time slot to the controlling node.

4. The method of claim 1, further comprising:
reporting measurements of a signal quality in at least one additional other TDD time slot.

5. The method of claim 4, according to which the further comprising:
reporting a ratio between an interference level in each of the second and other TDD time slots and a strength of the beacon signal in the first TDD time slot.

6. The method of claim 1, where the wireless communications system includes a Time Division Synchronous Code Multiple Access (TD SCDMA) system.

7. A user terminal for use in a wireless communications system in which there is at least one controlling node which controls traffic to and from the user terminal, and in which system use is made of a Time Division Duplex (TDD) principle for communication between said controlling node and the user terminal, the user terminal comprising:
means for measuring the signal strength of a beacon signal transmitted by said controlling node in a first TDD time slot;
means for measuring a signal quality from the controlling node in at least a second TDD time slot; and
means for reporting to the controlling node the signal strength of the beacon signal the first TDD time slot and the signal quality in at least a second TDD time slot; and
means for receiving a handover command from the controlling node responsive to the signal strength of the beacon signal in the first TDD time slot and the signal quality in the at least second TDD time slot.

8. The user terminal of claim 7, in which the signal quality measurement which is measured in said second TDD time slot is an interference level in said second TDD time slot.

9. The user terminal of claim 8, where the means for reporting reports a ratio between the interference level in the second TDD time slot and a strength of the beacon signal in the first TDD time slot to the controlling node.

10. The user terminal of claim 7, where the means for reporting further reports measurements of a signal quality in at least one additional TDD time slot to the controlling node.

11. The user terminal of claim 10, where the means for reporting reports said measurements as a ratio between an interference level in each of the second and additional TDD time slots and a strength of the beacon signal in the first TDD time slot.

12. A user terminal comprising:
a memory to:
store instructions; and
a microprocessor to execute the instructions to:
receive a beacon signal in a first Time Division Duplex (TDD) time slot from a controlling node in a wireless communications system,
measure a signal quality of the beacon signal and a signal quality in at least a second TDD time slot, and
report measurements of the signal quality of the beacon signal the first TDD time slot and the signal quality in the at least second TDD time slot to the controlling node, and
receive a handover command from the controlling node responsive to the measurements of the signal quality of the beacon signal in the first TDD time slot and the signal quality in the at least second TDD time slot.

13. The user terminal of claim 12, where the signal quality measurement in the at least second TDD time slot is an interference level in the at least second TDD time slot.

14. The user terminal of claim 13, where, when reporting the measurements, the microprocessor is to:
report a ratio between the interference level in the second TDD time slot and a strength of the beacon signal in the first TDD time slot to the controlling node.

15. The user terminal of claim 12, where the microprocessor is further to:
report measurements of a signal quality in at least one other TDD time slot to the controlling node.

16. The user terminal of claim 15, where the microprocessor is further to:
report, to the controlling node, a ratio between an interference level in each of the second and other TDD time slots and a strength of the beacon signal in the first TDD time slot.

17. The user terminal of claim 12, where the wireless communications system includes a Time Division Synchronous Code Multiple Access (TD SCDMA) system.

18. The user terminal of claim 12, where the controlling node is a base station.

* * * * *

UNITED STATES PATENT AND TRADEMARK OFFICE
CERTIFICATE OF CORRECTION

| | | |
|---|---|---|
| PATENT NO. | : 8,259,679 B2 | Page 1 of 2 |
| APPLICATION NO. | : 12/676057 | |
| DATED | : September 4, 2012 | |
| INVENTOR(S) | : Mao et al. | |

It is certified that error appears in the above-identified patent and that said Letters Patent is hereby corrected as shown below:

In the Drawings:

In Fig. 1, Sheet 1 of 7, delete "Fig" and insert -- Fig. --, therefor at each occurrence throughout the drawings.

In the Specification:

In Column 1, Line 14, delete "Code Multiple" and insert -- Code Division Multiple --, therefor.

In Column 1, Line 25, delete "B. i.e." and insert -- B, i.e. --, therefor.

In Column 2, Line 23, delete "applied, and" and insert -- applied, --, therefor.

In Column 2, Line 24, delete "art, and" and insert -- art, --, therefor.

In Column 2, Line 25, delete "invention, and" and insert -- invention, --, therefor.

In Column 2, Line 27, delete "solution, and" and insert -- solution, --, therefor.

In Column 2, Lines 38-39, delete "Code Multiple" and insert -- Code Division Multiple --, therefor.

In Column 2, Line 40, delete "systems in which" and insert -- systems. --, therefor.

In Column 4, Line 42, delete "1," and insert -- I, --, therefor.

In Column 6, Line 4, delete "means" and insert -- means, --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,259,679 B2

In the Claims:

In Column 6, Line 67, in Claim 4, delete "additional other" and insert -- other --, therefor.

In Column 7, Line 1, in Claim 5, after "claim 4," delete "according to which the".

In Column 7, Lines 7-8, in Claim 6, delete "Code Multiple" and
insert -- Code Division Multiple --, therefor.

In Column 8, Line 38, in Claim 17, delete "Code Multiple" and
insert -- Code Division Multiple --, therefor.